United States Patent
Thubert et al.

(10) Patent No.: US 10,412,010 B1
(45) Date of Patent: Sep. 10, 2019

(54) CONCENTRIC TRANSMISSIONS IN A DIRECTED ACYCLIC GRAPH BASED ON DEFERRED CONTENTION TO HIGHER DEVICES

(71) Applicant: Cisco Technology, Inc., San Jose, CA (US)

(72) Inventors: Pascal Thubert, La Colle sur Loup (FR); Patrick Wetterwald, Mouans Sartoux (FR); Huimin She, Shanghai (CN); Jianzhou Chen, Nanjing (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/954,786

(22) Filed: Apr. 17, 2018

(51) Int. Cl.
*H04L 12/851* (2013.01)
*H04L 12/753* (2013.01)

(52) U.S. Cl.
CPC .............. *H04L 47/24* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 8,102,775 B2 | 1/2012 | Thubert | |
| 9,420,518 B2 | 8/2016 | Purohit et al. | |
| 2008/0304485 A1* | 12/2008 | Sinha | H04L 12/66 370/392 |
| 2013/0010615 A1 | 1/2013 | Hui et al. | |
| 2013/0294436 A1* | 11/2013 | Kim | H04W 16/14 370/338 |
| 2013/0316705 A1* | 11/2013 | Kneckt | H04L 67/16 455/435.1 |

(Continued)

FOREIGN PATENT DOCUMENTS

CN 105071955 A 11/2015

OTHER PUBLICATIONS

Smith, "802.11 QoS Requirements", [online], Nov. 10, 2008, [retrieved on Mar. 29, 2018]. Retrieved from the Internet: URL: <http://ieee802.org/1/files/public/docs2008/avb-gs-802-11-qos-tutorial-1108.pdf>, pp. 1-24.

(Continued)

*Primary Examiner* — Ajit Patel
(74) *Attorney, Agent, or Firm* — Leon R. Turkevich

(57) ABSTRACT

In one embodiment, a network device starts a deferred discovery that defers to a prescribed transmission operation in response to detecting a message is from an identified higher device that is closer to a root of a network topology in a data network. The prescribed transmission operation and the deferred discovery each require a corresponding network device to wait at least a first half of a selected minimum contention interval before attempting transmission at a randomized position within a second half of the selected minimum contention interval. The minimum contention interval of the deferred discovery is at least twice the selected minimum contention interval. The network device transmits an updated message during the deferred discovery only if, upon reaching the corresponding randomized position of the deferred discovery, the subsequent messages from identified higher devices are less than a prescribed redundancy constant.

20 Claims, 9 Drawing Sheets

(56) References Cited

U.S. PATENT DOCUMENTS

| | | | |
|---|---|---|---|
| 2015/0373735 A1 | 12/2015 | Thubert et al. | |
| 2016/0007272 A1* | 1/2016 | McCann | H04W 48/08 370/254 |
| 2016/0132397 A1 | 5/2016 | Hui et al. | |
| 2016/0134161 A1 | 5/2016 | Hui et al. | |
| 2016/0149805 A1 | 5/2016 | Hui et al. | |
| 2018/0070379 A1 | 3/2018 | Thubert et al. | |

OTHER PUBLICATIONS

Cisco Systems, Inc., "Cisco Connected Grid WPAN Module for CGR 1000 Series Installation and CG-Mesh Configuration Guide", [online], Jun. 2017, [retrieved on Apr. 4, 2018]. Retrieved from the Internet: URL: <https://www.cisco.com/c/en/us/td/docs/routers/connectedgrid/modules/wpan/release_5-0/Cisco_Connected_Grid_WPAN_Module_for_CGR_1000_Series_Installation_and_CG-Mesh_Configuration_Guide.pdf>, pp. 1-52.

Paradisi et al., "Routing Algorithms for Wireless Sensor Networks", [online], Vrije Universiteit Brussel, May 9, 2014, [retrieved on Mar. 14, 2018]. Retrieved from the Internet: URL: <https://www.slideshare.net/asobimat/rpl-dodag>, pp. 1-37.

Yassein et al., "A New Dynamic Trickle Algorithm for Low Power and Lossy Networks", [online], Sep. 2016, [retrieved on Mar. 14, 2018]. Retrieved from the Internet: URL: <https://www.researchgate.net/publication/310478974_A_New_Dynamic_Trickle_Algorithm_for_Low_Power_and_Lossy_Networks>, pp. 1-7.

Tian et al., "A Fast DODAG Formation Method to Improve Trickle Algorithm with RPL", [online], IEEE WISPNET 2017 Conference, Feb. 22, 2018, [retrieved on Mar. 14, 2018]. Retrieved from the Internet: URL: <http://ieeexplore.ieee.org/document/8299829/>, pp. 603-606.

Levis et al., "The Trickle Algorithm", Internet Engineering Task Force (IETF), Request for Comments: 6206, Mar. 2011, pp. 1-13.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Thubert, Ed., "Objective Function Zero for the Routing Protocol for Low-Power and Lossy Networks (RPL)", Internet Engineering Task Force (IETF), Request for Comments: 6552, Mar. 2012, pp. 1-14.

Thubert et al., U.S. Appl. No. 15/446,705, filed Mar. 8, 2017.

Thubert et al., U.S. Appl. No. 15/902,028, filed Feb. 22, 2018.

* cited by examiner

CONCENTRIC TRANSMISSIONS IN A DIRECTED ACYCLIC GRAPH BASED ON DEFERRED CONTENTION TO HIGHER DEVICES

TECHNICAL FIELD

The present disclosure generally relates to concentric transmissions in a directed acyclic graph based on deferred contention to higher devices.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing network topology metrics (advertised in the DIO) to a prescribed objective function of the RPL instance. The "child" network device, upon attaching to its parent, can output its own DIO with updated network topology metrics that enable other network devices to discover the DODAG, learn the updated network topology metrics, and select a DODAG parent.

Any RPL node that is "powered up" can potentially output one or more DODAG Information Solicitation (DIS) messages as a probe for nearby DODAGs. Any RPL node that is "powered up" also can potentially advertise itself as a root of a "floating" DODAG based on outputting its own DIO specifying the advertised DODAG is floating.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
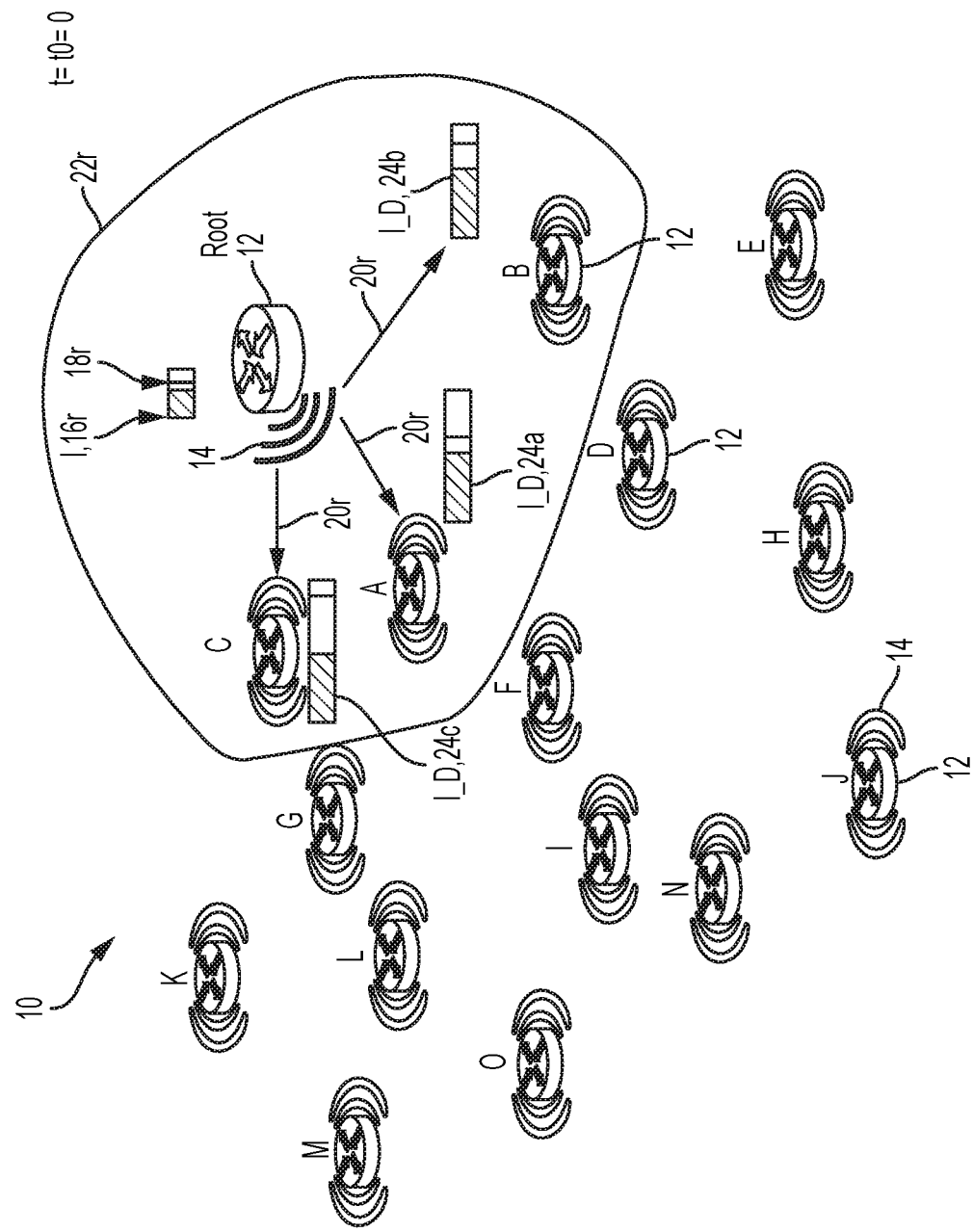
FIGS. 1A-1E illustrates an example data network having RPL network devices for executing deferred transmission operations that defer to prescribed transmission operations by higher devices that are closer to a RPL root, according to an example embodiment.

In one embodiment, a method comprises detecting, by a network device in a data network, that a message is from an identified higher device that is closer to a root of a network topology in the data network; starting, by the network device in response to detecting the message is from the identified higher device, a deferred transmission operation that defers to a prescribed transmission operation, the prescribed transmission operation and the deferred transmission operation each requiring a corresponding network device to wait at least a first half of a selected minimum contention interval before attempting transmission at a randomized position within a second half of the selected minimum contention interval, the starting including setting a corresponding minimum contention interval of the deferred transmission operation to at least twice the selected minimum contention interval; and selectively transmitting, by the network device, an updated message during the deferred transmission operation only if, upon reaching the corresponding randomized position of the deferred transmission operation, the network device determines a number of subsequent messages received from other identified higher devices is less than a prescribed redundancy constant.

In another embodiment, an apparatus comprises a device interface circuit and a processor circuit. The device interface circuit is configured for receiving a message in a data network. The processor circuit further is configured for detecting the message is from an identified higher device that is closer to a root of a network topology in the data network. The processor circuit is further configured for starting, in response to detecting the message is from the identified higher device, a deferred transmission operation that defers to a prescribed transmission operation. The prescribed transmission operation and the deferred transmission operation each require a corresponding network device to wait at least a first half of a selected minimum contention interval before attempting transmission at a randomized position within a second half of the selected minimum contention interval. The starting includes the processor circuit setting a corresponding minimum contention interval of the deferred transmission operation to at least twice the selected minimum contention interval. The processor circuit further is configured for causing the device interface circuit to selectively transmit an updated message during the deferred transmission operation only if, upon reaching the corresponding randomized position of the deferred transmission operation, the processor circuit determines a number of subsequent messages received from other identified higher devices is less than a prescribed redundancy constant.

In another embodiment, one or more non-transitory tangible media are encoded with logic for execution by a machine and when executed by the machine operable for: detecting, by the machine implemented as a network device in a data network, that a message is from an identified higher device that is closer to a root of a network topology in the data network; starting, by the network device in response to detecting the message is from the identified higher device, a deferred transmission operation that defers to a prescribed transmission operation, the prescribed transmission operation and the deferred transmission operation each requiring a corresponding network device to wait at least a first half of a selected minimum contention interval before attempting transmission at a randomized position within a second half of the selected minimum contention interval, the starting including setting a corresponding minimum contention interval of the deferred transmission operation to at least twice the selected minimum contention interval; and selectively transmitting, by the network device, an updated message during the deferred transmission operation only if, upon reaching the corresponding randomized position of the deferred transmission operation, the network device determines a number of subsequent messages received from other identified higher devices is less than a prescribed redundancy constant.

DETAILED DESCRIPTION

Particular embodiments cause network devices in a data network to defer to higher network devices that are closer to a root of a DAG network topology in a data network, based on causing the network devices to execute a deferred transmission operation that defers (i.e., grants a higher priority) to the higher network devices in the DAG network topology. The deferred transmission operation defers to the higher devices that are executing a prescribed transmission operation, for example a prescribed discovery operation comprising attempted transmission of discovery information messages (e.g., DIO messages) at a randomized position after a selected minimum contention interval, for example according to the Trickle Algorithm specified under the Internet Engineering Task Force (IETF) Request for Comments (RFC) 6206 and according to the RPL protocol as specified in RFC 6550.

Conventional deployments of the RPL protocol (e.g., according to RFC 6550) can suffer from many hours of delay in initialization of a DAG network topology in LLNs that contain thousands of network devices that are densely deployed in the data network. For example, a smart grid Advanced Metering Infrastructure (AMI) network can utilize a connected grid mesh (CG-Mesh) that comprises a field area router (FAR) and thousands of network devices, where each network device can reach, within its transmission range, hundreds of neighboring network devices.

RFC 6550 permits a network device when powered up to proactively transmit one or more DIS messages to solicit transmission of a DIO message from a neighboring network device, or the powered-up network device can proactively transmit a DIO message specifying itself as a root of a floating DAG: although such proactive operations may appear beneficial in enabling a limited number of powered-up devices to attach to an existing DAG network topology, such operations by a powered-up device can interfere with initialization of the DAG network topology that relies on propagation of DIO messages outward from the DAG root (i.e., root-originated DIO messages), for example in response to initial power-up of all the network devices in the LLN, and/or in response to recovery from a power outage in at least a portion of the LLN. Hence, in the case of initialization of the DAG network topology in response to an initial power-up or power outage recovery, the proactive transmission of DIS messages and/or DIO messages executed concurrently by hundreds or thousands of network devices can dramatically interfere with the reliable propagation of the root-originated DIO messages that are used to initialize the DAG network topology.

In addition, Section 18.2.1.1. of RFC 6550 permits a network device to "stay silent", waiting to receive DIO messages from the DODAG of interest, and not send any multicast DIO messages until the network device (i.e., "new network device") has joined a DODAG. However, even if the new network device has joined a DODAG, the DIO message transmitted by the new network device can still interfere with "higher" network devices that are closer to the DAG root within the DAG topology that are still attempting to transmit their respective DIO messages from "higher" in the DAG topology (i.e., having a lower rank and closer to the DAG root than the new network device); hence, the DIO transmitted by the "new" network device can interfere with the attempted transmission of DIO messages by respective "higher" network devices, resulting in an unbalanced propagation of DIO messages throughout the LLN network. Such unbalanced propagation of DIO messages can result in "churn", where network devices repeatedly change their preferred parent from a "lower" network device (having a higher rank and further from the DAG root) to a "higher" network device (having a lower rank and closer to the DAG root) as the DIO messages are propagated by the "higher" network devices. The resulting "churn" can cause oscillation in the propagation of DIO messages and can trigger network reformation for child nodes affected by the oscillation, resulting in substantially long delays (hours long) before the DAG topology can converge to a stable topology.

According to example embodiments, messages originated by a DAG root (e.g., root-originated DIO messages) can be evenly and reliably propagated throughout the data network, without interference by "lower" network devices, based on the "lower" network devices in the data network deferring to "higher" network devices (e.g., potential parent devices during initialization of a DAG network topology) in a data network. The deferring by the lower network devices guarantees that higher network devices closer to the DAG root can first attempt transmission of messages (e.g., DIS messages) before any "lower" network device attempts to transmit its own updated message (e.g., an updated DIS message) in response to receiving the message from a higher network device.

The example embodiments can ensure that network devices defer to higher network devices operating according to a prescribed transmission operation, for example according to a prescribed discovery operation such as attempted transmission of DIO messages according to the Trickle algorithm per Sec. 8.3 of RFC 6550. The network devices can defer to higher network devices based on setting a corresponding minimum contention interval "I_D" of the deferred transmission operation to be at least twice the selected minimum contention interval "I" used by any of the higher network devices.

The selected minimum contention interval "I" of the prescribed transmission operation can be randomly selected between an identified range that is greater or equal to a prescribed minimum contention interval "Imin", and less than or equal to a prescribed maximum contention interval "Imax", i.e., "Imin≤I≤Imax". Hence, the randomized position "t" of the prescribed transmission operation can be randomly selected between a second identified range that is greater or equal to the one-half the selected minimum contention interval "I/2" (where "/" represents a division operation) and less than the prescribed maximum contention interval "Imax", i.e., "I/2≤t<I"; hence, even if the selected minimum contention interval "I" equals the prescribed maximum contention interval "Imax" (i.e., "I=Imax"), the randomized position "t" remains less than the prescribed maximum contention interval "Imax" (i.e., "t<Imax"); hence, each network device executing the prescribed transmission operation (e.g., Trickle) can select the corresponding randomized position "t" to be before the prescribed maximum contention interval "Imax".

Hence, the deferred transmission operation of the example embodiments causes a network device to defer to any potential parent device attempting transmission of a corresponding message according to the prescribed transmission operation, as the minimum contention interval "I_D" of the deferred transmission operation can be set to at least twice the prescribed maximum contention interval "Imax" of the prescribed transmission operation, i.e., "I_D≥2*Imax", where "*" represents a multiplication operation.

A topological constant "L" also can be used to further refine the deferral of the network devices, relative to the prescribed maximum contention interval duration "Imax". A topological constant "L" can be set to a value of one or more, causing each network device to start its deferred transmission operation by setting its corresponding minimum contention interval "I_D" by multiplying the prescribed maximum contention interval "Imax" by an exponential multiple ($2^L$) having the topological constant (L) as the exponent, for example "I_D=Imax*$2^L$". Hence, the example embodiments can ensure that the root-originated messages (e.g., DIO messages) can be evenly and reliably propagated throughout the data network, effectively forming concentric "waves" of root-originated messages that are propagated by "rings" of network devices based on their distance (e.g., hop count, rank, etc.) from the root, without any interference by "lower" network devices that are located in "lower" rings. The example embodiments can dramatically reduce the time required to form a DODAG in an LLN in cases where the root-originated messages are routing protocol messages such as DIO messages; the example embodiments also can substantially reduce the time to propagate any root-originated message throughout the DODAG.

FIG. 1A illustrates an example data network 10 comprising multiple network devices 12 configured for establishing a tree-based network topology, for example a Directed Acyclic Graph (DAG) or a Destination Ordered DAG (DODAG), according to an example embodiment. Each of the network devices (e.g., "Root", "A" through "O") 12 can be configured for forming a DAG network topology via wired or wireless data links 14, for example according to RPL as specified in the IETF RFC 6550, including executing a prescribed transmission operation such as the Trickle algorithm according to RFC 6206.

Although only the network devices "Root", "B", and "D", and "J" are labeled with the reference numeral "12" in FIGS. 1A-1E to avoid cluttering in the Figures, it should be apparent that all the network devices "Root" and "A" through "O" are allocated the reference numeral "12" for purposes of the description herein. Further, it should be apparent that all the network devices "Root" and "A" through "O" 12 are configured for establishing wired or wireless data links 14 (illustrated as curved lines radiating from each device 12), even though only the wireless data links for the network devices "Root" and "J" 12 are labeled with the reference numeral "14" to avoid cluttering in the Figures.

Each of the network devices 12 are configured for executing the prescribed transmission operation (e.g., Trickle) for establishing a selected minimum contention interval "I" (16r of FIG. 1) within a range of a prescribed minimum contention interval (e.g., "Imin" of RFC 6206) and a prescribed maximum contention interval (e.g., "Imax" of RFC 6206), i.e., "Imin≤I≤Imax"; each of the network devices also can select a randomized position "t" (18r of FIG. 1), i.e., "I/2≤t<I", where the corresponding network device 12 must wait at least the first half of the selected minimum contention interval "I" 16 (illustrated with hashed lines) before attempting transmission at the randomized position "t" 18 within the second half of the selected minimum contention interval "I" 16, and where the corresponding network device 12 can transmit only if its corresponding redundancy counter "c" is less than a prescribed redundancy constant "k", described in RFC 6206.

As illustrated in FIG. 1, the root network device "root" 12 can be configured (e.g., by a network administrator) for identifying itself as the DAG root to initiate transmission of its DIO message 20r (e.g., at time t=t0=0), for example during initialization of the DAG network topology after initial power-up or as part of a recovery operation following a power outage. As described in detail in RFC 6550, the DIO message 20r can specify its identity (e.g., IPv6 address), that the network device 12r transmitting the DIO message 20r is the root of the DAG network topology, and a corresponding rank (e.g., rankRoot=1) of the root network device 12r, where a lower rank value indicates a distance closer to the root network device 12r and a higher rank value indicates a distance further to the root network device 12r.

Each DIO message 20 also can optionally specify a "ring" identifier that specifies a relative position of the transmitting network device 12 within the DAG network topology, hence the DIO message 20r output by the DAG root 12 can specify a ring identifier of "Ring1" to specify that the corresponding DIO message 20r is transmitted by a member of the first logical ring "Ring1" closest to the DAG root device 12. The ring identifier can be prescribed for each network device (e.g., set in each network device 12 by a network administrator), or alternately the non-root network devices "A" through "O" 12 can choose their root identifier based on comparing their relative ranks or rank ranges, described below.

As described in further detail below, each of the network devices "A", "B", and "C" are allocated higher rank values relative to the root (e.g., rankA=140 for network device "A", rankB=130 for network device "B", rankC=180 for network device "C"). Hence, the network devices "A", "B", and "C" receiving the DIO message 20r within the transmission range 22r of the DAG root device 12 each can determine that the received DIO message 20r is from a network device that is "closer" to the DAG root device 12, and in response start a deferred transmission operation (44 of FIG. 3) that defers to any prescribed transmission operation (42 of FIG. 3) by setting a corresponding minimum contention interval "I_D" 24 of the deferred transmission operation (also referred to herein as the "deferred minimum contention interval") to be at least twice the selected minimum contention interval "I" 16 used by any of the higher network devices. Hence any network device 12, in response to detecting a DIO message 20 is received from a higher device that is closer to the DAG root device 12, can start a deferred transmission by setting its corresponding deferred minimum contention interval "I_D" 24 to at least twice the selected minimum contention interval "I" 16, ensuring that the network device 12 does not interfere with an attempted transmission by a higher network device.

Figure 1B:
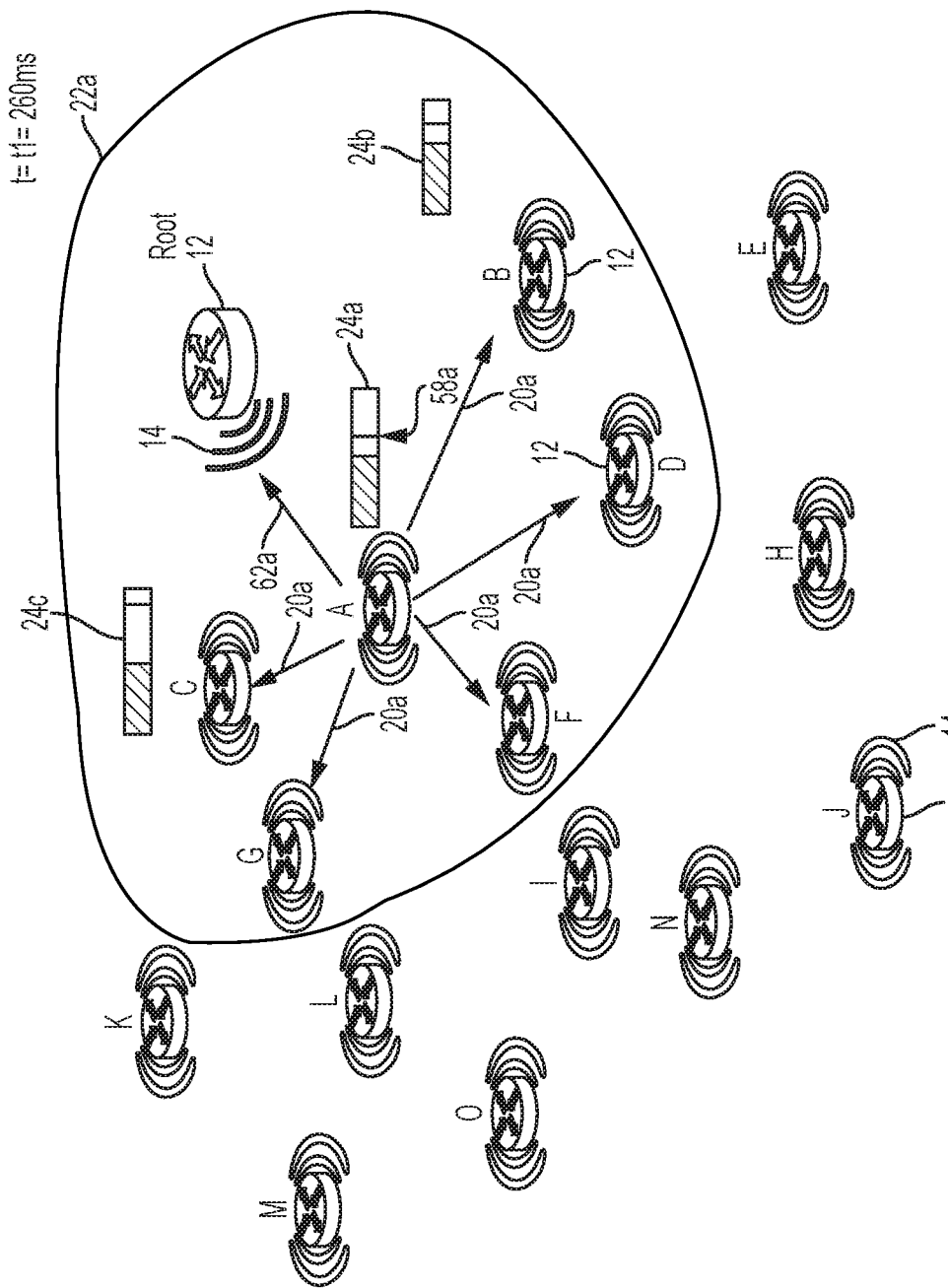
Figure 1C:
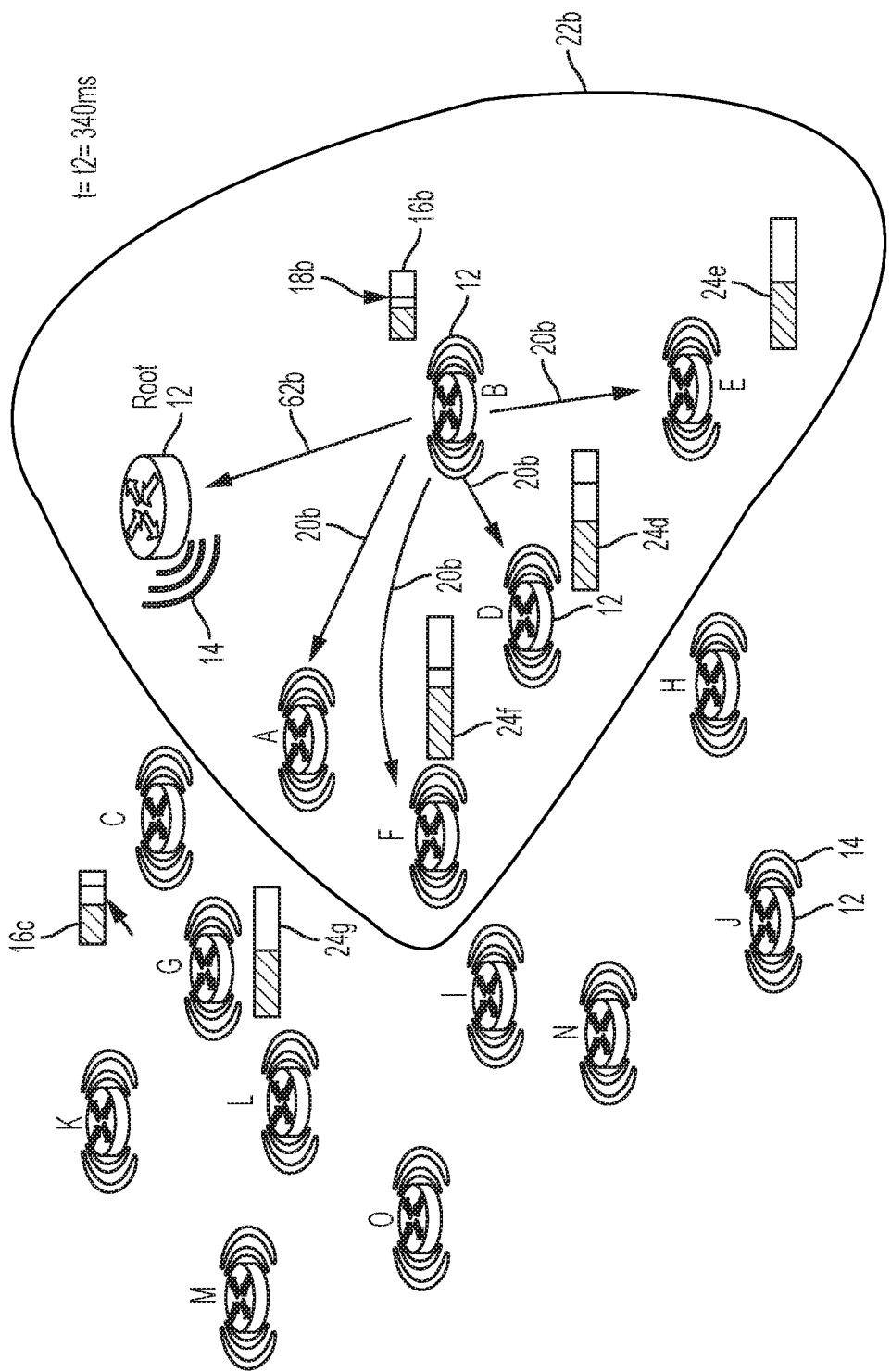
Figure 1D:
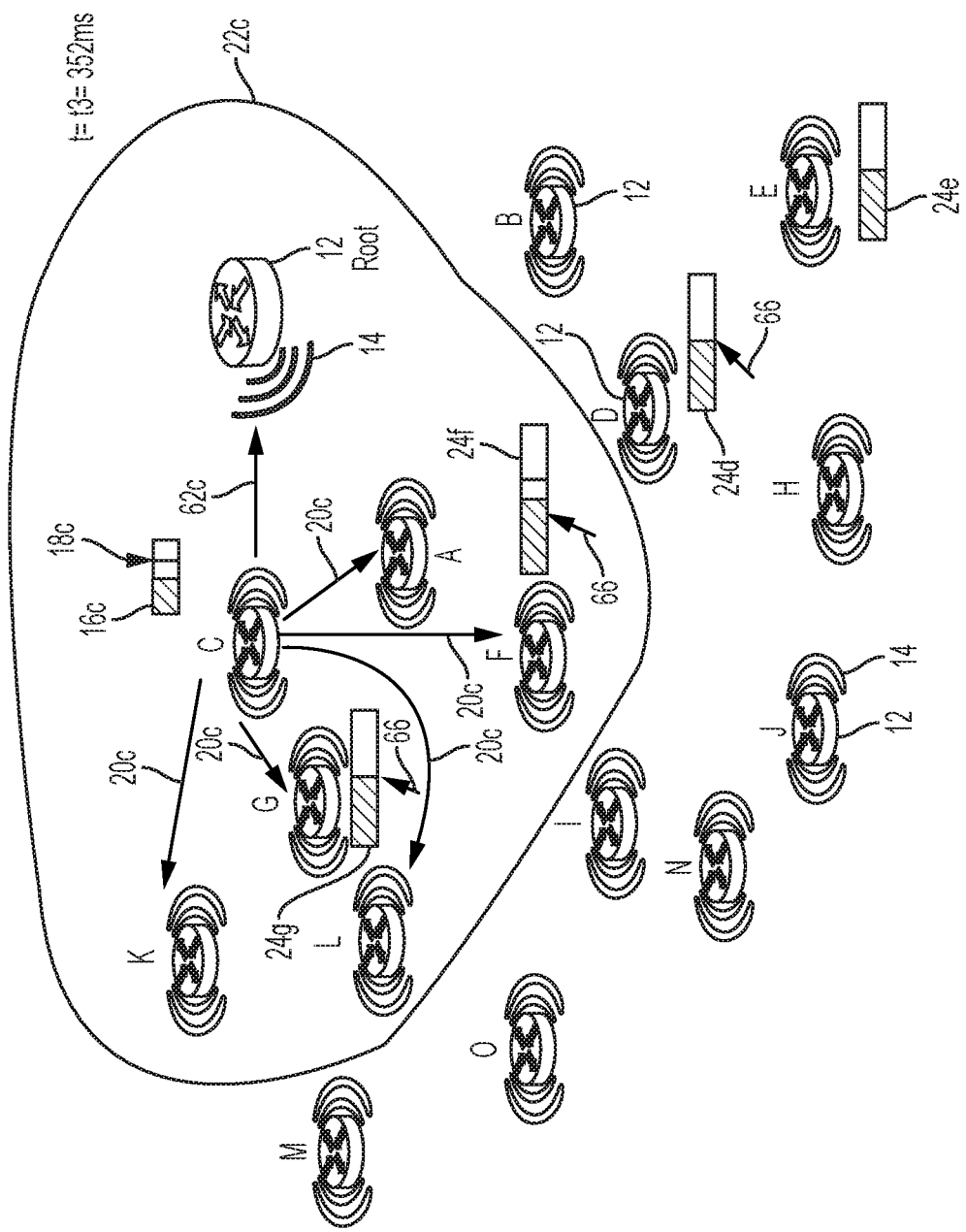
Figure 1E:
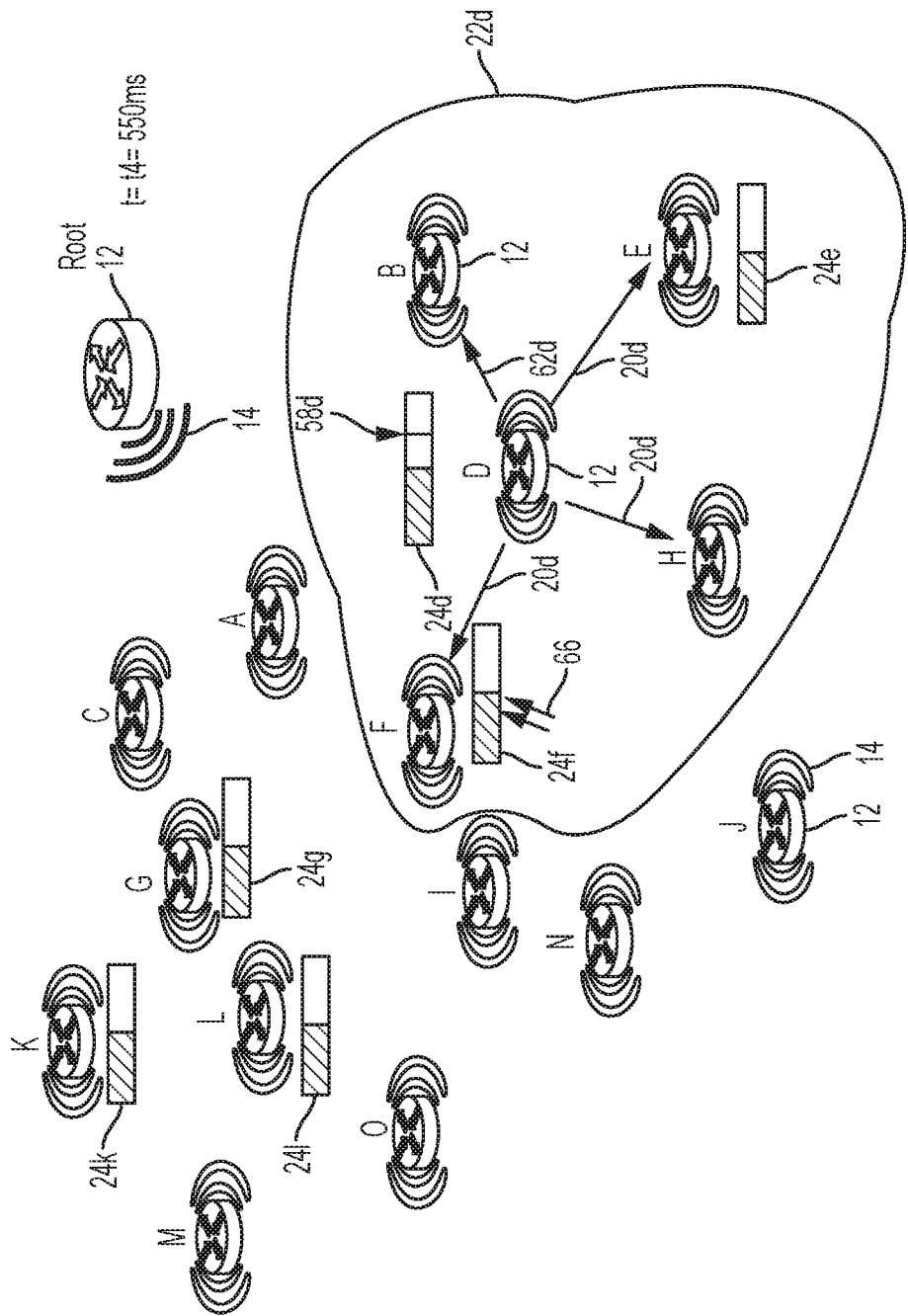
Figure 2:
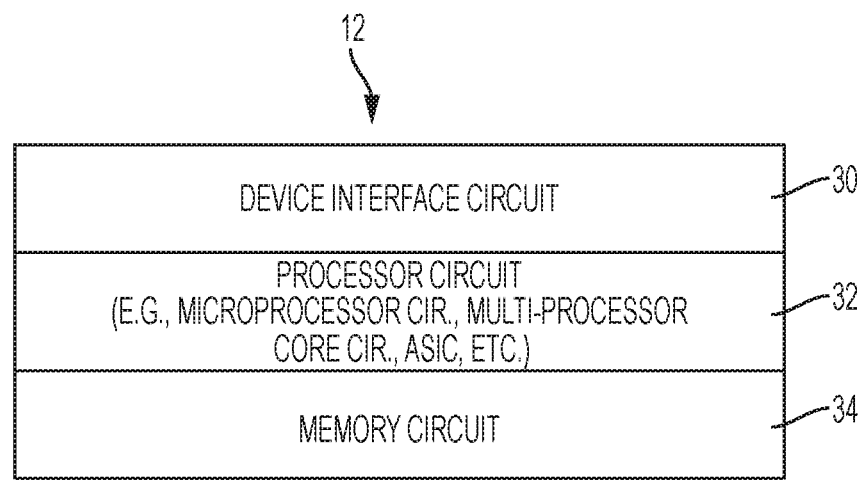
FIG. 2 illustrates an example implementation of any one of the network devices of FIG. 1, according to an example embodiment.

FIG. 2 illustrates an example implementation of any one of the network devices 12 of FIGS. 1A-1E, according to an example embodiment. Each apparatus 12 is a physical machine (i.e., a hardware device) configured for implementing network communications with other physical machines 12 via the data network 10. The term "configured for" or "configured to" as used herein with respect to a specified operation refers to a device and/or machine that is physically constructed and arranged to perform the specified operation.

Each apparatus 12 can include a device interface circuit 30, a processor circuit 32, and a memory circuit 34. The device interface circuit 30 can include one or more distinct physical layer transceivers for communication with any one of the other devices 12; the device interface circuit 30 also can include an IEEE based Ethernet transceiver for communications with the devices of FIG. 1 via any type of data link (e.g., a wired or wireless link, an optical link, etc.). The processor circuit 32 can be configured for executing any of the operations described herein, and the memory circuit 34 can be configured for storing any data or data packets as described herein.

Any of the disclosed circuits of the devices 12 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 3:
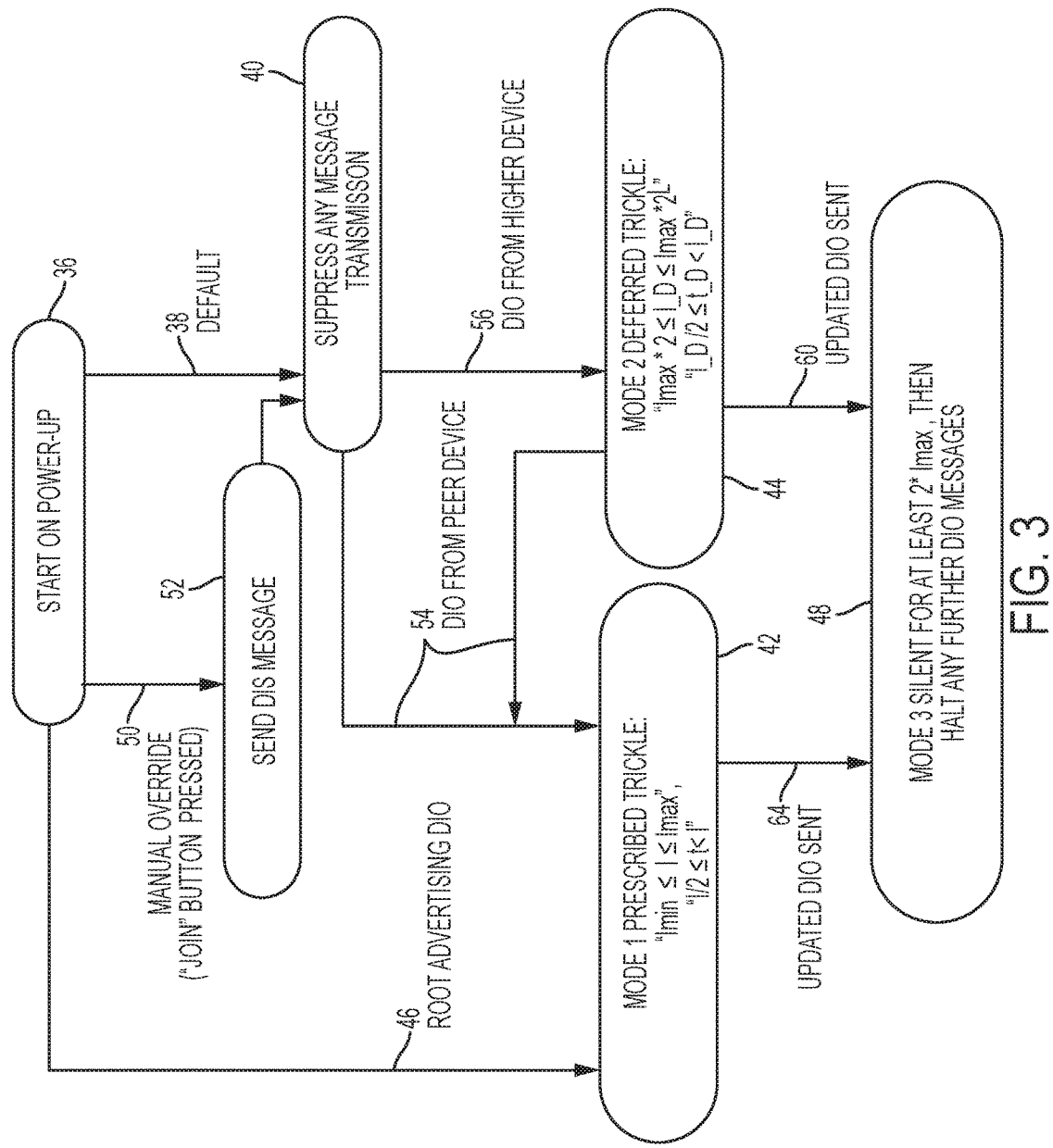
FIG. 3 illustrates an example state diagram executed by the non-root RPL network devices summarizing execution of the deferred transmission operations of FIGS. 1A-1E, according to an example embodiment.
Figure 4A:
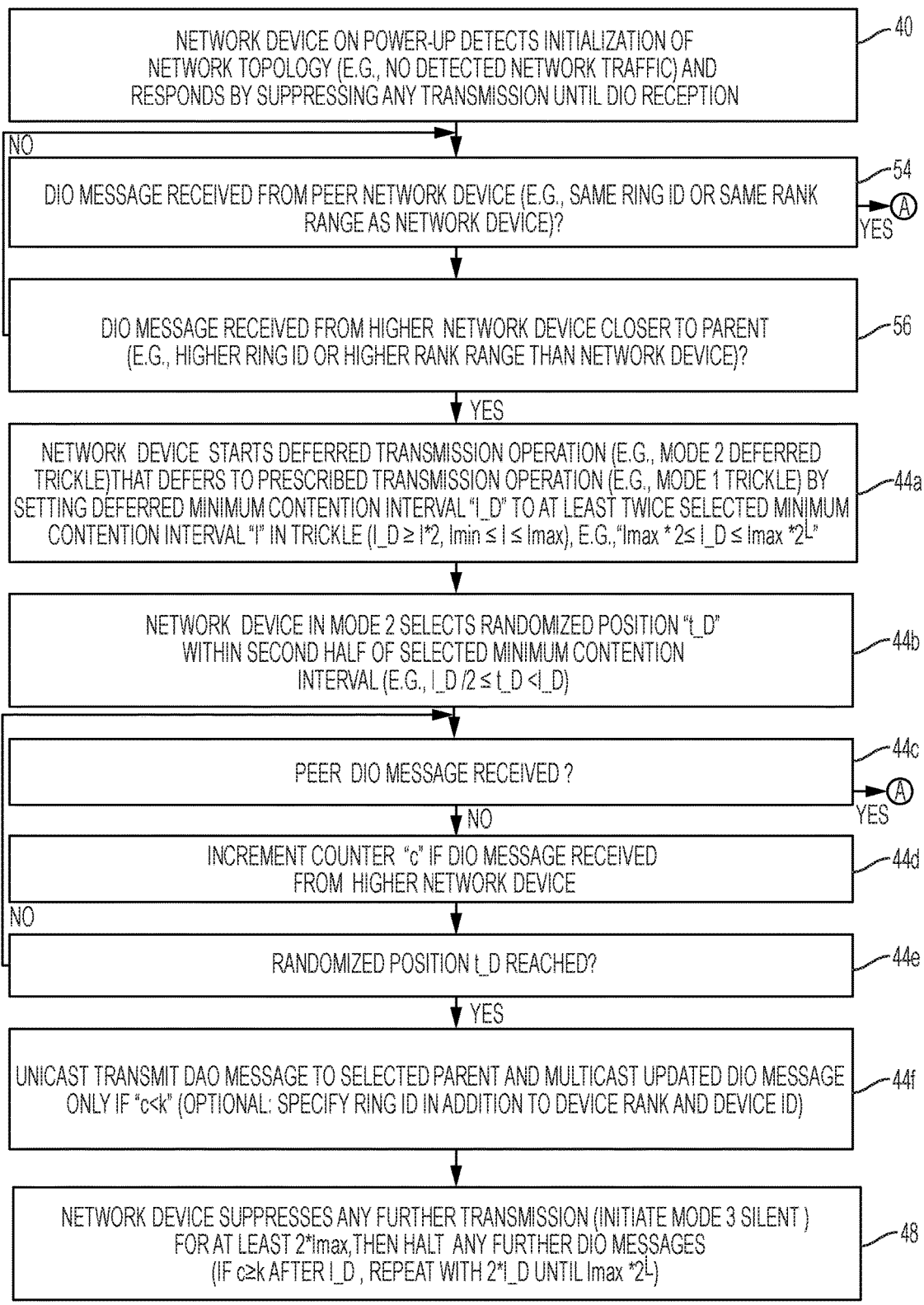
FIGS. 4A and 4B are diagrams illustrating a method of executing the deferred transmission operations of FIGS. 1A-1E, according to an example embodiment.
Figure 4B:
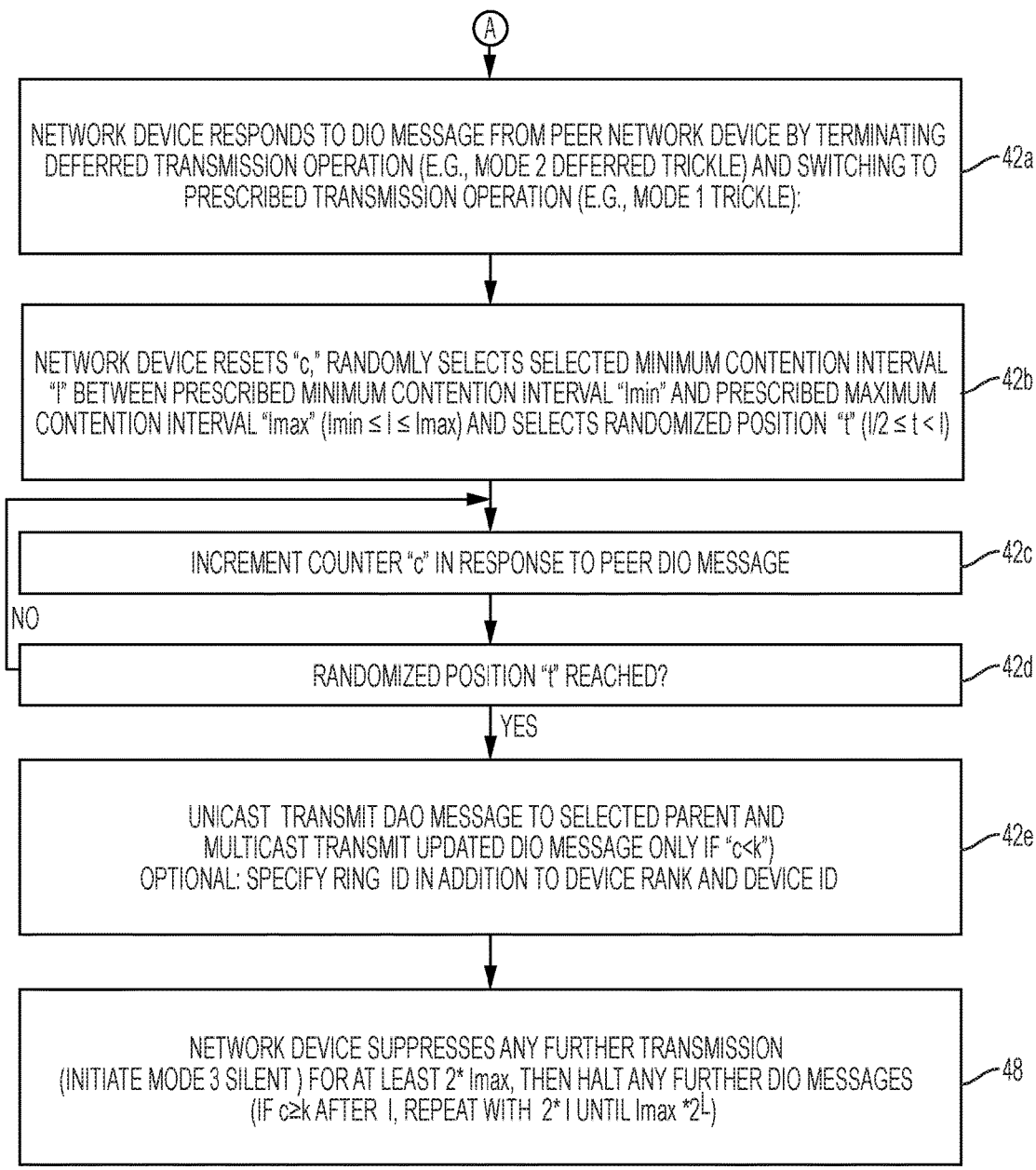

FIG. 3 illustrates an example state diagram executed by the non-root RPL network devices summarizing execution of the deferred transmission operations of FIGS. 1A-1E, according to an example embodiment. FIGS. 4A and 4B are diagrams illustrating a method of executing the deferred transmission operations of FIGS. 1A-1E, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

In one embodiment, each network device 12 can be configured for storing in its memory circuit 34 prescribed settings for executing the mode 1 (Trickle) operation 42, including the prescribed minimum contention interval "Imin" (e.g., "Imin=100 ms"), the prescribed maximum contention interval "Imax" (e.g., "Imax=200 ms), and the prescribed redundancy constant "k" (e.g., "k=2"); each network device 12 also is configured for storing the dynamic variables used during execution of the mode 1 (Trickle) operation 42, including the corresponding selected minimum contention interval "I" 16, the corresponding randomized position "t" 18, and the corresponding counter value "c". The prescribed settings for executing the mode 1 (Trickle) operation 42 can be set, for example, by an administrator or field technician during deployment of the network device 12. Each network device 12 also can be configured for storing in its memory circuit 34 any of the parameters and/or variables associated with the "mode 2" deferred transmission operation 44.

Referring to FIGS. 3 and 4A, each the processor circuit 32 of each network device 12 (except for the DAG root device 12) is configured for responding to a start state 36 upon power-up (e.g., initial power-up upon device activation or power loss recovery) by following a default setting 38 that causes each network device 12 (except for the DAG root device 12) to suppress in operation 40 the transmission of any message in the data network 10 until receiving a prescribed message (e.g., a DIO message 20) from a higher network device, described in detail below. For example, the network device 12 of each non-root network device (e.g., "A" through "O") 12 can detect in operation 40 of FIG. 4A that the DAG topology is under initialization, for example based on a determined absence of any data traffic in the data network 10 for at least a prescribed time interval equal to or longer than the prescribed maximum contention interval "Imax", and in response suppress in operation 40 any transmission prior to initiation of any one of the prescribed transmission operation (also referred to as "mode 1", e.g., Trickle according to RFC 6206) 42, or the deferred transmission operation 44 as described herein.

Two exceptions to the non-root default state 38 of entering the non-root suppression state 40 is the DAG root device 12 which can respond to identifying at event 46 that it has a DIO message 20r to transmit by initiating the mode 1 (Trickle) operation 42, and transmitting its DIO message 20r at the selected randomized position "t" 18r, illustrated in FIG. 1A; as described in further detail, the DAG root device 12 can respond to transmission of its DIO message 20r by entering a "mode 3" (i.e., "silent" mode) operation 48 that suppresses any further transmissions for at least twice the maximum prescribed contention interval "Imax", followed by suppressing any further transmissions of DIO messages 20r (unless routing operations are required under RFC 6550).

The second exception to the non-root default state 38 of entering the non-root suppression state 40 can be a manual override operation 50, for example an installer pushing a "join" button on a newly-installed network device 12 to cause the newly-installed network device 12 to output in operation 52 a DIS message into an existing DAG topology. However, after the single transmission of the DIS message in operation 52 the newly-installed network device 12 enters the non-root suppression state 40 as described previously.

As illustrated in FIG. 1A, the DAG root device 12 can transmit its DIO message 20r at the randomized position "t" 18r (e.g. at time t=t0=0 coinciding with the randomized position "t" 18r) within the second half of its selected minimum contention interval "I" 16. Each of the non-root network devices "A" through "O" 12 are in the non-root suppression state 40 at time "t=0" associated with the transmission time of the DIO message 20r. Hence, each of the neighboring network devices "A", "B", and "C" 12 within the transmission range 22r of the DAG root device 12 can respond to reception of the DIO message 20 by first determining in operation 54 whether the received DIO message 20 is from a peer network device. Each network device 12 can be configured for storing in its memory circuit 34 its "rank" within the DAG: each network device 12 can decide whether to attach to a potential parent device advertising a DIO message 20 based on whether the corresponding DIO message 20 specifies that the potential parent device has a rank value that is lower than the corresponding rank value stored in the memory circuit 34. A lower rank value indicates a distance closer to the root network device 12r and a higher rank value indicates a distance further to the root network device 12r, hence generally a network device 12 will chose a potential parent device that advertises a lower rank value indicating it is closer to the DAG root device 12.

According to an example embodiment, the DIO message 20r received in operation 54 can optionally specify a ring identifier of "Ring1" to specify that the corresponding DIO message 20r is transmitted by a member of the first logical ring "Ring1" owned by (i.e., closest to) the DAG root device 12. Each of the network devices "A", "B", and "C" 12 can be allocated (e.g., by a network administrator or based on a previously-cached calculation) a ring identifier of "Ring2" that is stored in its corresponding memory circuit 34, indicating that the corresponding network device 12 wants to be a member of a second propagation ring of DIOs initiated by a child of the DAG root device 12; in other words, a first-hop child network device (e.g., "A", "B", and/or "C") of the DAG root device 12 can be considered a child of the first logical ring "Ring1" and a member of a second logical ring "Ring2" in response to receiving the DIO message 20r specifying the first logical ring "Ring1". Hence, any first-hop child (e.g., "A", "B", and/or "C") of the DAG root device 12 stores in its memory circuit 34 a corresponding ring identifier of "Ring2" (as a child of "Ring1"). The ring identifier also enables each network device 12 to determine whether a received DIO message 20 is from advertising network device is a potential parent network device that is closer to the network device 12 (based on the potential parent network device advertising a lower ring identifier), or whether the advertising network device is a peer network device that is at substantially the same depth in the DAG (based on the advertising network device specifying the same ring identifier as stored in the receiving network device).

In an alternate embodiment, since each of the network devices are allocated rank values, the processor circuit 32 of each network device 12 receiving a DIO message 20 can determine the relative "ring" position based on associating the rank advertised in the received DIO message 20 with one of a peer class of network devices or a higher class of network devices, where the higher class includes a first prescribed range values (e.g., "Ring1" class for rank range 1-100), and the peer class includes a second prescribed range of rank values that is increased relative to the first prescribed range (e.g., "Ring2" class for rank range 101-200). For example, the DAG root device 12 can be allocated "Ring1" for rank ranges 1-100, and non-root network devices can be allocated any one of "Ring2" for rank ranges 101-200, "Ring3" for rank ranges 201-300, "Ring4" for rank ranges 301-400, etc. As described previously, each of the network devices "A", "B", and "C" are allocated higher rank values relative to the root (e.g., rankA=140 for network device "A", rankB=130 for network device "B", rankC=180 for network device "C").

Hence, the device interface circuit 30 of each of the network devices "A", "B", and "C", within the transmission range 22r of the DAG root device 12, are configured for receiving the DIO message 20r at time "t=1" of FIG. 1A. The processor circuit 32 of each the network devices "A", "B", and "C" can determine in operation 54 that the received DIO message 20r is not from a peer network device in operation 54 (either because the advertised "Ring1" is a lower ring identifier indicating a higher network device than the "Ring2" identifier used by the network devices "A", "B", or C", or because the advertised "rankRoot=1" is in the first prescribed range of "Ring1" which is lower than the second prescribed class range "Ring2" for which the network devices A, B, and C belong).

Hence, processor circuit 32 of each the network devices "A", "B", and "C" can determine in operation 56 that the DIO message 20r is from a network device that is "closer"

to the DAG root device 12 (in this case, is from the network device 12 itself). The processor circuit 32 of each the network devices "A", "B", and "C" in operation 44 of FIGS. 3 and 44a of FIG. 4A in response to detecting the DIO message 20 is from a higher network device can start the "mode 2" deferred transmission operation 44 that defers to any prescribed transmission operation (42 of FIG. 3) by setting in operation 44a a corresponding deferred minimum contention interval "I_D" 24 to be at least twice the selected minimum contention interval "I" 16 used by any of the higher network devices. Since the selected minimum contention interval "I" 16 can have a range of "Imin≤I≤Imax", the deferred minimum contention interval "I_D" 24 can be set to at least twice the prescribed maximum contention interval "Imax" ("I_D≥Imax*2") to ensure that the network device absolutely defers to any higher network device executing the mode 1 (Trickle) operation 42. The processor circuit 32 of each non-root network device 12 also can be configured for setting a relative maximum deferred contention interval based on a nonzero topological constant "L" set by an administrator, based on the topological characteristics of the data network 10 and/or the DAG that is initialized. For example a RPL network formed from a string of lighting elements along a highway can have a one-dimensional (linear) topology, i.e., each network device has no more than one child, hence the chance of interference is minimal such that the topological constant can be set to "L=1", i.e., the deferred minimum contention interval "I_D" 24 can be set at "I_D=2*Imax"; in more complex network topologies, e.g., 2-dimensional or 3-dimensional topologies where non-root network devices 12 can have multiple children devices, the topological constant can have a value greater than one, such that the deferred minimum contention interval "I_D" 24 can be chosen by one of the non-root network devices from a range of "Imax*2≤I_D≤Imax*2$^L$".

Hence, the processor circuit 32 of each of the network devices "A", "B", and "C" can respond to the DIO message 20r by selecting in operation 44a a corresponding deferred minimum contention interval "I_D" that is at least twice the prescribed maximum contention interval (e.g., "Imax=200 milliseconds (ms))", for example the network device "A" can chose "I_D=400 milliseconds (ms)" 24a, the network device "B" can choose "I_D=600 ms" 24b, and the network device C" can choose "I_D=700 ms" 24c, illustrated in FIG. 1A as starting at time "t=0". The processor circuit 32 of each of the network devices "A", "B", and "C" in operation 44b can select a randomized deferred position "t_D" 58 that is after a first half of the deferred minimum contention interval "I_D" 24 (indicated by the hashed lines) and within a randomized position within the second half of the deferred minimum contention interval "I_D" 24. For example, the processor circuit 32 of the network device "A" can select the randomized deferred position "t_D=260 ms" (58a of FIG. 1B), the processor circuit 32 of the network device "B" can select the randomized deferred position "t_D=450 ms", and the processor circuit 32 of the network device "C" can select the randomized deferred position "t_D=460 ms".

Hence, the network device "A" in the deferred transmission operation (mode 2) 44 at the randomized deferred position "t_D=260 ms" 58a after time "t=0" (i.e., receiving the DIO message 20r at time "t=0" in FIG. 1A) in operation 44e can determine that it has not received any other "peer DIO message" (i.e., a DIO message 20 from a peer network device as described with respect to operation 54) in operation 44c, it has not needed to increment its counter "c" in operation 55d in response to receiving another DIO message 20 from a "Ring1" higher network device. Hence, the processor circuit 32 of the network device "A" 12 can determine in operation 44f that its counter "c=0" is less than the redundancy constant "k=2", and in response the processor circuit 32 of the network device "A" 12 in operation 44f (event 60 of FIG. 3) can transmit its updated DIO message 20a, illustrated in FIG. 1B at time "t=t1=260 ms". The updated DIO message 20a output by the device interface circuit 30 of the network device "A" 12 can specify its device identifier (e.g., "A") the DAG identifier (e.g., identifier of the DAG root device 12), the rank of the transmitting network device "A", and optionally the ring identifier "Ring2". The processor circuit 32 of the network device "A" also can cause the device interface circuit 30 to output a destination advertisement object (DAO) 62a to the DAG root device 12, for example according to RFC 6550.

In response to the network device "A" 12 transmitting its DIO message 20a at event 60 and its DAO message 62a, the processor circuit 32 of the network device "A" 12 executes its mode 3 (silent) operation 48 that causes the network device "A" to suppress any further transmission for at least twice the prescribed maximum contention interval "Imax" (e.g., at least 800 ms), with no further transmission of a DIO message 20a.

As illustrated in FIG. 1B, the network devices "B", "C", "D", "F", and "G" 12 receive the DIO message 20a that was transmitted within the transmission range 22a at time "t=t1=260 ms". Each of the network devices "B" and "C" 12, in response to detecting in operation 44c that the DIO message 20a is from a peer network device "A" (either by identifying network device "A" belongs to the same "Ring 2" or the same ring range based on its corresponding rank 140), can respond to event 54 (FIG. 3) by terminating the deferred transmission operation (mode 2) 44 and starting execution of the mode 1 (Trickle) operation 42 of FIG. 3, starting with the operation 42a of FIG. 4B. For example, network device "B" in operation 42b at event "t1=260 ms" can select its selected minimum contention interval "I" 16 as "I=120 ms" 16b, and the network device "C" in operation 42b at event "t1=260 ms" can select its selected minimum contention interval "I" 16 as "I=180 ms" 16c, illustrated in FIG. 1C. The network device "B" in operation 42b at event "t1=260 ms" also can select its randomized position "t" 18 as "t=80" 18b (FIG. 1C), and the network device "C" in operation 42b at event "t1=260 ms" can select its randomized position "t" 18 as "t=92 ms" 18c, illustrated in FIG. 1D. Hence, the network devices "B" and "C" can initiate their respective trickle timers, starting at time "t1=260 ms", and wait until the respective randomized positions of "t=80 ms" 18b and "t=92 ms" 18c.

Assume the network device "D" is allocated the rank "rankD=220" and optionally the ring value "Ring3"; the network device "E" is allocated the rank "rankE=275" and optionally the ring value "Ring3"; the network device "F" is allocated the rank "rankF=225" and optionally the ring value "Ring3"; the network device "G" is allocated the rank "rankG=210". Hence, in response to the network devices "D", "F", and "G" 12 receiving the DIO message 20a while in their non-root suppression state 40, the processor circuit 32 of each of the network devices "D", "F", and "G" 12 in operation 56 can determine that the DIO message 20a is from a higher network device based on the ring value "Ring2" and/or the advertised rank value "rankA=140" specified in the DIO message 20a. Hence, the processor circuit 32 of each network device "D", "F", and "G" 12 in operation 44 (44a of FIG. 4A) can select its corresponding deferred minimum contention interval "I_D" 24. For example the network device "D" can select the deferred minimum contention interval "I_D" 24 "I_D=500 ms" 24d (FIG. 1C), the network device "F" can select the deferred minimum contention interval "I_D" 24 "I_D=450 ms" 24f (FIG. 1C), and the network device "G" can select the deferred minimum contention interval "I_D" 24 "I_D=700 ms" 24g (FIG. 1C).

The processor circuit 32 of each network device "D", "F", and "G" 12 in operation 44b also can select its corresponding randomized deferred position "t_D" 58, for example the network device "D" can select the randomized deferred position "t_D" 58 "t_D=290 ms" 58d (FIG. 1E), the network device "F" can select the randomized deferred position "t_D" 58 "t_D=250 ms", and the network device "G" can select the randomized deferred position "t_D" 58 "t_D=650 ms".

Hence, at time "t=t1=260 ms", the device "A" completes its transmission of the DAO message 62a and the DIO message 20a and in response to completed transmission starts its trickle timer for the mode 3 (silent) operation 48 of at least "t=800 ms"; the device "B" (in "Ring2") has its trickle timer set for the corresponding randomized position "t=80 ms" 18b (FIG. 1C), the device "C" (in "Ring2") has its trickle timer set for the corresponding randomized position "t=92 ms" 18c (FIG. 1D), the device "D" (in "Ring3") has its trickle timer set for the corresponding randomized deferred position "t=t_D=290 ms" 58d (FIG. 1E), the device "F" (in "Ring3") has its trickle timer set for the corresponding randomized deferred position at "t=t_D=250 ms", and the device "G" (in "Ring3") has its trickle timer set for the corresponding randomized deferred position at "t=t_D=650 ms". Consequently, the network devices "D", "F", and "G" 12 (in "Ring 3") defer to the "higher" network devices "B" and "C" (in "Ring2").

Hence, the network device "B" in FIG. 1C operating in the mode 1 (Trickle) operation 42 can determine that, upon reaching its corresponding randomized position 18b at time "t=t2=340 ms" in operation 42d of FIG. 4B, it has not received any other "peer DIO message" (identifying the same ring identifier "Ring2" or identifying a same rank range "101-200") and therefore has not needed to increment its counter "c" in operation 42c. Hence, the processor circuit 32 of the network device "B" 12 can determine in operation 42e that its counter "c=0" is less than the redundancy constant "k=2", and in response the processor circuit 32 of the network device "B" 12 in operation 42e (event 64 of FIG. 3) can transmit its updated DIO message 20b, illustrated in FIG. 1C at time "t=t2=340 ms". The updated DIO message 20b output by the device interface circuit 30 of the network device "B" 12 can specify its device identifier (e.g., "B") the DAG identifier (e.g., identifier of the DAG root device 12), the rank of the transmitting network device "B" (e.g., rankB=130), and optionally the ring identifier "Ring2". The processor circuit 32 of the network device "B" also can cause the device interface circuit 30 to output a destination advertisement object (DAO) 62b to the DAG root device 12, for example according to RFC 6550.

In response to the network device "B" 12 transmitting its updated DIO message 20b at event 64 and its DAO message 62b, the processor circuit 32 of the network device "B" 12 executes its mode 3 (silent) operation 48 that causes the network device "B" to suppress any further transmission for at least twice the prescribed maximum contention interval "Imax", with no further transmission of a DIO message 20b.

As illustrated in FIG. 1C, the network devices "A", "D", "E", and "F" 12 receive the updated DIO message 20b that was transmitted within the transmission range 22b at time "t=t2=340 ms"; however, other network devices including the network devices "C" and "G" 12 do not detect the updated DIO message 20b because they are outside the transmission range 22b.

The network device "A" 12 remains in its mode 3 (silent) operation 48 in response to reception of the DIO message 20b, hence the network device "A" 12 in operation 48 suppresses any transmission in response to reception of the DIO message 20b at time "t=t2". The processor circuit 32 of the network device "D" (having rank "rankD=220" and/or allocated to the ring value "Ring3") 12 responds to reception of the DIO message 20b during its deferred transmission operation (mode 2) 44 by determining the DIO message 20b is from a higher network device "B" (based on the corresponding DIO message 20b advertising the rank "rankB=130" and optionally the ring value "Ring2"), and in response incrementing its corresponding counter to "c=1" in operation 44d of FIG. 4A (66 of FIG. 1D). The processor circuit 32 of the network device "F" (having rank "rankF=225" and/or allocated to the ring value "Ring3") 12 also responds to reception of the DIO message 20b during its deferred transmission operation (mode 2) 44 by determining the DIO message 20b is from a higher network device "B" (based on the corresponding DIO message 20b advertising the rank "rankB=130" and optionally the ring value "Ring2"), and in response incrementing its corresponding counter to "c=1" in operation 44d of FIG. 4A (66 of FIG. 1D).

The network device "E" 12 that is operating in its non-root suppression state 40 at time "t=t2" of FIG. 1C, can respond to detecting the DIO message 20b by determining in operation 56 of FIG. 4A that the DIO message 20b is from a higher network device based on the advertised rank value "rankB=130" (and optionally the advertised ring value "Ring2") specified in the DIO message 20b. Hence, the processor circuit 32 of the network device "E" in operation 44 of FIG. 3 (44a of FIG. 4A) can select its corresponding deferred minimum contention interval "I_D" 24, for example the network device "E" can select the deferred minimum contention interval "I_D" 24 "I_D=600 ms" 24e (FIG. 1C). The processor circuit 32 of the network device "E" in operation 44b also can select its corresponding randomized deferred position "t_D" 58, for example "t_D=550 ms".

Hence, at time "t=t2=340 ms" the device "A" (in "Ring2") has waited 80 ms within its 800 ms mode 3 (silent) operation 48 that started at time "t=t1=260 ms", the device "B" (in "Ring2") completes its transmission of the DAO message 62b and the DIO message 20b and in response to completed transmission starts its trickle timer for the mode 3 (silent) operation 48 of at least "t=800 ms"; the device "D" (in "Ring3") having operated for 80 ms of its 290 ms deferral in the deferred transmission operation (mode 2) 44 (that started at time "t=t1=260 ms") increments its counter to "c=1", and the device "F" (in "Ring3") having operated for 80 ms of its 250 ms deferral in the deferred transmission operation (mode 2) 44 (that started at time "t=t1=260 ms") increments its counter to "c=1"; and the device "E" (in "Ring3") has its trickle timer set for the corresponding randomized deferred position at "t=t_D=550 ms". Consequently, the network devices "D", "F", "E", and "G" 12 (in "Ring 3") defer to the "higher" network device "C" (in "Ring2") having waited 80 ms within its randomized position "t=92 ms" 18c that started at time "t=t1=260 ms".

Hence, the network device "C" in FIG. 1D operating in the mode 1 (Trickle) operation 42 can determine that, upon reaching its corresponding randomized position 18c at time "t=t3=352 ms" in operation 42d of FIG. 4B, it has not received any other "peer DIO message" (identifying the same ring identifier "Ring2" or identifying a same rank range "101-200") and therefore has not needed to increment its counter "c" in operation 42c. Hence, the processor circuit 32 of the network device "C" 12 can determine in operation 42e that its counter "c=0" is less than the redundancy constant "k=2", and in response the processor circuit 32 of the network device "C" 12 in operation 42e (event 64 of FIG. 3) can transmit its updated DIO message 20c, illustrated in FIG. 1C at time "t=t3=352 ms". The updated DIO message 20c output by the device interface circuit 30 of the network device "C" 12 can specify its device identifier (e.g., "C") the DAG identifier (e.g., identifier of the DAG root device 12), the rank of the transmitting network device "C" (e.g., rankC=180), and optionally the ring identifier "Ring2". The processor circuit 32 of the network device "C" also can cause the device interface circuit 30 to output a destination advertisement object (DAO) 62c to the DAG root device 12, for example according to RFC 6550. Hence, the DAG root network device 12r can establish downward routes for reaching the network devices "A", "B", and "C" based on the respective DAO messages 62a, 62b, and 62c.

In response to the network device "C" 12 transmitting its updated DIO message 20c at event 64 and its DAO message 62c, the processor circuit 32 of the network device "C" 12 executes its mode 3 (silent) operation 48 that causes the network device "C" to suppress any further transmission for at least twice the prescribed maximum contention interval "Imax", with no further transmission of a DIO message 20c.

As illustrated in FIG. 1D, the network devices "A", "F", "G", "K", and "L" 12 receive the updated DIO message 20c that was transmitted within the transmission range 22c at time "t=t3=352 ms"; however, other network devices including the network devices "B", "D", and "E" 12 do not detect the updated DIO message 20b because they are outside the transmission range 22c.

The network device "A" 12 remains in its mode 3 (silent) operation 48 in response to reception of the DIO message 20c, hence the network device "A" 12 in operation 48 suppresses any transmission in response to reception of the DIO message 20b at time "t=t3". The processor circuit 32 of the network device "F" (having rank "rankF=225" and/or allocated to the ring value "Ring3") 12 responds to reception of the DIO message 20c during its corresponding deferred transmission operation (mode 2) 44 by determining the DIO message 20c is from a higher network device "C" (based on the corresponding DIO message 20c advertising the rank "rankC=180" and optionally the ring value "Ring2"), and in response increments the corresponding counter to "c=2" in operation 44d of FIG. 4A (66 of FIG. 1E): as described in FIG. 3 with respect to operation 44 and FIG. 4 with respect to operation 44f, since the counter value equals the redundancy constant "c=k=2" the network device "F" is suppressed from any transmissions during its deferred minimum contention interval "I_D" 24f. The processor circuit 32 of the network device "G" the network device "G" (having rank "rankG=210" and/or allocated to the ring value "Ring3") 12 also responds to reception of the DIO message 20c during its deferred transmission operation (mode 2) 44 by determining the DIO message 20c is from a higher network device "C" (based on the corresponding DIO message 20c advertising the rank "rankC=180" and optionally the ring value "Ring2"), and in response incrementing its corresponding counter to "c=1" in operation 44d of FIG. 4A (66 of FIG. 1D).

The network devices "K" and "L" 12 that are operating in their respective non-root suppression states 40 at time "t=t3" of FIG. 1D each can respond to detecting the DIO message 20c by determining in operation 56 of FIG. 4A that the DIO message 20c is from a higher network device based on the advertised rank value "rankC=180" (and optionally the advertised ring value "Ring2") specified in the DIO message 20c. Hence, the corresponding processor circuit 32 of each of the network devices "K" and "L" in operation 44 of FIG. 3 (44a of FIG. 4A) can select its corresponding deferred minimum contention interval "I_D" 24: for example the network device "K" can select the deferred minimum contention interval "I_D" 24 "I_D=600 ms" 24k (FIG. 1E), and in operation 44b can select its corresponding randomized deferred position "t_D" 58, for example "t_D=650 ms"; the network device "L" can select the deferred minimum contention interval "I_D" 24 "I_D=400 ms" 24l (FIG. 1E), and in operation 44b can select its corresponding randomized deferred position "t_D" 58, for example "t_D=250 ms".

Hence, at time "t=t3=352 ms" the device "A" (in "Ring2") has waited 92 ms within its 800 ms mode 3 (silent) operation 48 that started at time "t=t1=260 ms"; the device "B" (in "Ring2") has waited 12 ms within its 800 ms mode 3 (silent) operation 48 that started at time "t=t2=340 ms"; the device "C" (in "Ring2") completes its transmission of the DAO message 62c and the DIO message 20c and in response to completed transmission starts its trickle timer for the mode 3 (silent) operation 48 of at least "t=800 ms"; the device "D" (in "Ring3") having operated for 92 ms of its 290 ms deferral in the deferred transmission operation (mode 2) 44 (that started at time "t=t1=260 ms") maintains its counter at "c=1"; the device "E" (in "Ring3") having operated for 12 ms of its 550 ms deferral in the deferred transmission operation (mode 2) 44 (that started at time=t2=340 ms) maintains its counter at "c=0"; the device "F" (in "Ring3") having operated for 92 ms of its 250 ms deferral in the deferred transmission operation (mode 2) 44 (that started at time "t=t1=260 ms") is suppressed from transmissions during its deferred minimum contention interval "I_D" 24f in response to its counter "c=2" having reached the redundancy constant "k=2"; the network device "G" (in "Ring3") having operated for 92 ms of its 650 ms deferral in the deferred transmission operation (mode 2) 44 (that started at time "t=t1=260 ms") increments its counter to "c=1"; the device "K" (in "Ring3") has its trickle timer set for the corresponding randomized deferred position at "t=t_D=650 ms"; and the device "L" (in "Ring3") has its trickle timer set for the corresponding randomized deferred position at "t=t_D=250 ms".

Consequently, the network devices "A", "B", "C" 12 (in "Ring2") have completed transmission of their respective DIO message 20s and enter the mode 3 (silent) operation 48, enabling the "Ring3" network devices (e.g., "D", "E", "G", "K", and "L") to contend for transmission of the next DIO message 20. As noted previously, the network device "F" is suppressed from any transmission during its corresponding deferred minimum contention interval "I_D" 24f in response to its counter having reached the redundancy constant "c=k=2"; hence, the network device "F" 12 is suppressed from transmission at time "t=510 ms", which is the expiration of its randomized deferred position "t_D=250" that was initiated at time "t=t1=260 ms".

Hence, the network device "D" in FIG. 1E operating in the deferred transmission operation (mode 2) 44 can determine that, upon reaching its corresponding randomized position 58d at time "t=t4=550 ms" in operation 44e, it has not received any other "peer DIO message" (i.e., a DIO message 20 from a peer network device as described with respect to operation 54) in operation 44c, it has incremented its counter "c" to "c=1" in operation 55d in response to receiving the updated DIO message 20b from the "Ring1" higher network device "B". Hence, the processor circuit 32 of the network device "D" 12 can determine in operation 44f that its counter "c=1" is less than the redundancy constant "k=2", and in response the processor circuit 32 of the network device "D" 12 in operation 44f (event 60 of FIG. 3) can transmit its updated DIO message 20d, illustrated in FIG. 1E at time "t=t4=550 ms". The updated DIO message 20d output by the device interface circuit 30 of the network device "D" 12 can specify its device identifier (e.g., "D") the DAG identifier (e.g., identifier of the DAG root device 12), the rank ("rankD=220") of the transmitting network device "D", and optionally the ring identifier "Ring3". The processor circuit 32 of the network device "D" also can cause the device interface circuit 30 to output a destination advertisement object (DAO) 62d to the network device "B" 12, for example according to RFC 6550.

In response to the network device "D" 12 transmitting its DIO message 20d at event 60 and its DAO message 62d, the processor circuit 32 of the network device "D" 12 executes its mode 3 (silent) operation 48 that causes the network device "D" to suppress any further transmission for at least twice the prescribed maximum contention interval "Imax" (e.g., at least 800 ms), with no further transmission of a DIO message 20d. As illustrated in FIG. 1E, the network devices "E", "F", and "H" 12 receive the updated DIO message 20b that was transmitted within the transmission range 22d at time "t=t4=550 ms"

The network device "B" 12 remains in its mode 3 (silent) operation 48 in response to reception of the DIO message 20d, hence the network device "B" 12 in operation 48 suppresses any transmission in response to reception of the DIO message 20d at time "t=t4". The processor circuit 32 of each of the network devices "E" and "F" operating in the deferred transmission operation (mode 2) 44 can detect from the received DIO message 20d that the DIO message 20d (specifying rank "rankD=220" and/or allocated to the ring value "Ring3") is from a peer network device "D", for example based on determining the network device "D" belongs to the same "Ring3" or the same rank range (201-300) based on its corresponding rank "rankD=220".

Hence, the processor circuit 32 of each of the network devices "E" and "F" can respond to the DIO message 20d at event 54 (FIG. 3) and operation 44c in operation 4A by terminating the deferred transmission operation (mode 2) 44 and starting execution of the mode 1 (Trickle) operation 42 of FIG. 3, starting with the operation 42a of FIG. 4B. For example, network device "E" in operation 42b at event can select its selected minimum contention interval "I" 16 as "I=150", and the network device "F" in operation 42b can select its selected minimum contention interval "I" 16 as "I=124 ms"; the network device "E" in operation 42b also can select its randomized position "t" 18 as "t=150", and the network device "F" in operation 42b can select its randomized position "t" 18 as "t=80 ms". Hence, the network devices "E" and "F" can initiate their respective trickle timers, starting at time "t4=550 ms", and wait until the respective randomized positions of "t=150 ms" and "t=80 ms" 18c.

Hence, the network devices "E" and "F" of "Ring3" can accelerate their negotiating of their respective DIO messages based on the completion of the "Ring2" propagation by the network devices "A", "B", and "C" 12 that are a single hop from the DAG root device 12, enabling the propagation of the next "ring" of DIO messages via the network devices associated with "Ring3".

The network device "H" 12 operating in its non-root suppression state 40 at time "t=t4" of FIG. 1E can respond to detecting the DIO message 20d by determining in operation 56 of FIG. 4A that the DIO message 20d is from a higher network device based on the advertised rank value "rankD=220" (and optionally the advertised ring value "Ring3") specified in the DIO message 20c, relative to its rank (e.g., "rankH=308") or ring identifier (e.g., network device "H" belongs to "Ring4"). Hence, the corresponding processor circuit 32 of the network device "H" in operation 44 of FIG. 3 (44a of FIG. 4A) can select its corresponding deferred minimum contention interval "I_D" 24, for example "I_D=420 ms", and in operation 44b can select its corresponding randomized deferred position "t_D" 58, for example "t_D=450 ms". Hence, the network device can start its deferred transmission operation (mode 2) 44 by deferring at least "I_D=420 ms" 58 from time "t=t4=550 ms", enabling the network devices "E" and "F" to attempt transmission using the prescribed transmission operation at the randomized positions "t=150 ms" and "t=80 ms" from "t=t4=550 ms", respectively.

Hence any network device 12, in response to detecting a DIO message 20 is received from a higher device that is closer to the DAG root device 12, can start a deferred transmission by setting its corresponding deferred minimum contention interval "I_D" 24 to at least twice the selected minimum contention interval "I" 16, ensuring that the network device 12 does not interfere with an attempted transmission by a higher network device.

Although only a subset of the network devices 12 in the Figures are illustrated as outputting a DIO message 20 to avoid cluttering in the Figures, it should be apparent that all the network devices "A" through "O" 12 can output a corresponding DIO message 20 and a corresponding DAO message.

According to example embodiments, transmission priority is granted by network devices in a directed acyclic graph to "higher" network devices that are closer to a root of the directed acyclic graph. The example embodiments enable the higher network device to obtain prioritized transmission of a data packet, followed by a silent period to minimize interference. The example embodiments also enable network devices to detect when they should begin claiming the higher priority for further transmission of the data packet to other network devices. Hence, the example embodiments a prioritization scheme for concentric transmissions in a data network, based on the relative "depth" of network devices in the network topology.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   detecting, by a network device in a data network, that a message is from an identified higher device that is closer to a root of a network topology in the data network;
   starting, by the network device in response to detecting the message is from the identified higher device, a deferred transmission operation that defers to a prescribed transmission operation, the prescribed transmission operation and the deferred transmission operation each requiring a corresponding network device to wait at least a first half of a selected minimum contention interval before attempting transmission at a randomized position within a second half of the selected minimum contention interval, the starting including setting a corresponding minimum contention interval of the deferred transmission operation to at least twice the selected minimum contention interval; and selectively transmitting, by the network device, an updated message during the deferred transmission operation only if, upon reaching the corresponding randomized position of the deferred transmission operation, the network device determines a number of subsequent messages received from other identified higher devices is less than a prescribed redundancy constant.

2. The method of claim 1, further comprising:

detecting, by the network device, an initialization of the network topology; and responding, by the network device, to the initialization by suppressing any transmission prior to initiation of the deferred transmission operation.

3. The method of claim 1, further comprising:

detecting, by the network device, a second message is from an identified peer network device having substantially a same depth in the network topology as the network device;

terminating, by the network device, the deferred transmission operation and initiating the prescribed transmission operation in response to detecting the second message; and selectively transmitting, by the network device, the updated message during the initiated prescribed transmission operation only if, upon reaching the corresponding randomized position of the initiated prescribed transmission operation, the network device determines a number of subsequent second messages received from other identified peer network devices is less than a prescribed redundancy constant.

4. The method of claim 3, further comprising identifying a network device as one of the identified higher devices or one of the peer network devices based on one of:

associating a rank in a received discovery message with one of a peer class of network devices or a higher class of network devices, the higher class including a first prescribed range of rank values and the peer class including a second prescribed range of rank values that is increased relative to the first prescribed range; or comparing a ring identifier in the received discovery message with a prescribed ring identifier allocated to the network device, the peer network devices identified by the prescribed ring identifier and the higher devices identified by a lower ring identifier.

5. The method of claim 1, further comprising:

suppressing, by the network device, any further transmission following the transmission of the updated message for at least twice the selected minimum contention interval; and following the suppressing, halting any further transmissions of the updated message.

6. The method of claim 1, wherein:

the prescribed transmission operation requires the corresponding network device to select the selected minimum contention interval within a range of a prescribed minimum contention interval and a prescribed maximum contention interval, and select the corresponding randomized position before the prescribed maximum contention interval;

the setting including setting the corresponding minimum contention interval of the deferred transmission operation to at least twice the prescribed maximum contention interval of the prescribed transmission operation.

7. The method of claim 1, wherein the deferred transmission operation causes the network device to defer to any higher device attempting transmission of a corresponding message according to the prescribed transmission operation.

8. An apparatus comprising:

a device interface circuit configured for receiving a message in a data network; and a processor circuit configured for detecting the message is from an identified higher device that is closer to a root of a network topology in the data network;

the processor circuit configured for starting, in response to detecting the message is from the identified higher device, a deferred transmission operation that defers to a prescribed transmission operation, the prescribed transmission operation and the deferred transmission operation each requiring a corresponding network device to wait at least a first half of a selected minimum contention interval before attempting transmission at a randomized position within a second half of the selected minimum contention interval, the starting including the processor circuit setting a corresponding minimum contention interval of the deferred transmission operation to at least twice the selected minimum contention interval;

the processor circuit further configured for causing the device interface circuit to selectively transmit an updated message during the deferred transmission operation only if, upon reaching the corresponding randomized position of the deferred transmission operation, the processor circuit determines a number of subsequent messages received from other identified higher devices is less than a prescribed redundancy constant.

9. The apparatus of claim 8, wherein the processor circuit further is configured for:

detecting an initialization of the network topology; and responding to the initialization by suppressing any transmission prior to initiation of the deferred transmission operation.

10. The apparatus of claim 8, wherein the processor circuit further is configured for:

detecting a second message is from an identified peer network device having substantially a same depth in the network topology as the apparatus;

terminating the deferred transmission operation and initiating the prescribed transmission operation in response to detecting the second message; and selectively causing the device interface circuit to transmit the updated message during the initiated prescribed transmission operation only if, upon reaching the corresponding randomized position of the initiated prescribed transmission operation, the processor circuit determines a number of subsequent second messages received from other identified peer network devices is less than a prescribed redundancy constant.

11. The apparatus of claim 10, wherein the processor circuit further is configured for identifying a network device as one of the identified higher devices or one of the peer network devices based on one of:

associating a rank in a received discovery message with one of a peer class of network devices or a higher class of network devices, the higher class including a first prescribed range of rank values and the peer class including a second prescribed range of rank values that is increased relative to the first prescribed range; or comparing a ring identifier in the received discovery message with a prescribed ring identifier allocated to the apparatus, the peer network devices identified by the prescribed ring identifier and the higher devices identified by a lower ring identifier.

12. The apparatus of claim 8, wherein the processor circuit further is configured for:
    suppressing any further transmission following the transmission of the updated message for at least twice the selected minimum contention interval; and
    following the suppressing, halting any further transmissions of the updated message.

13. The apparatus of claim 8, wherein:
    the prescribed transmission operation requires the corresponding network device to select the selected minimum contention interval within a range of a prescribed minimum contention interval and a prescribed maximum contention interval, and select the corresponding randomized position before the prescribed maximum contention interval;
    the processor circuit further configured for setting the corresponding minimum contention interval of the deferred transmission operation to at least twice the prescribed maximum contention interval of the prescribed transmission operation.

14. The apparatus of claim 8, wherein the deferred transmission operation causes the apparatus to defer to any higher device attempting transmission of a corresponding message according to the prescribed transmission operation.

15. One or more non-transitory tangible media encoded with logic for execution by a machine and when executed by the machine operable for:
    detecting, by the machine implemented as a network device in a data network, that a message is from an identified higher device that is closer to a root of a network topology in the data network;
    starting, by the network device in response to detecting the message is from the identified higher device, a deferred transmission operation that defers to a prescribed transmission operation, the prescribed transmission operation and the deferred transmission operation each requiring a corresponding network device to wait at least a first half of a selected minimum contention interval before attempting transmission at a randomized position within a second half of the selected minimum contention interval, the starting including setting a corresponding minimum contention interval of the deferred transmission operation to at least twice the selected minimum contention interval; and
    selectively transmitting, by the network device, an updated message during the deferred transmission operation only if, upon reaching the corresponding randomized position of the deferred transmission operation, the network device determines a number of subsequent messages received from other identified higher devices is less than a prescribed redundancy constant.

16. The one or more non-transitory tangible media of claim 15, further operable for:
    detecting, by the network device, an initialization of the network topology; and
    responding, by the network device, to the initialization by suppressing any transmission prior to initiation of the deferred transmission operation.

17. The one or more non-transitory tangible media of claim 15, further operable for:
    detecting, by the network device, a second message is from an identified peer network device having substantially a same depth in the network topology as the network device;
    terminating, by the network device, the deferred transmission operation and initiating the prescribed transmission operation in response to detecting the second message; and
    selectively transmitting, by the network device, the updated message during the initiated prescribed transmission operation only if, upon reaching the corresponding randomized position of the initiated prescribed transmission operation, the network device determines a number of subsequent second messages received from other identified peer network devices is less than a prescribed redundancy constant.

18. The one or more non-transitory tangible media of claim 15, further operable for:
    suppressing, by the network device, any further transmission following the transmission of the updated message for at least twice the selected minimum contention interval; and
    following the suppressing, halting any further transmissions of the updated message.

19. The one or more non-transitory tangible media of claim 15, wherein:
    the prescribed transmission operation requires the corresponding network device to select the selected minimum contention interval within a range of a prescribed minimum contention interval and a prescribed maximum contention interval, and select the corresponding randomized position before the prescribed maximum contention interval;
    the setting including setting the corresponding minimum contention interval of the deferred transmission operation to at least twice the prescribed maximum contention interval of the prescribed transmission operation.

20. The one or more non-transitory tangible media of claim 15, wherein the deferred transmission operation causes the network device to defer to any higher device attempting transmission of a corresponding message according to the prescribed transmission operation.

* * * * *